(12) United States Patent
Lee et al.

(10) Patent No.: US 6,480,110 B2
(45) Date of Patent: Nov. 12, 2002

(54) INDUCTIVELY TUNABLE ANTENNA FOR A RADIO FREQUENCY IDENTIFICATION TAG

(75) Inventors: Youbok Lee, Chandler, AZ (US); Lee Furey, Phoenix, AZ (US); Roger St. Amand, Tempe, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 09/728,190

(22) Filed: Dec. 1, 2000

(65) Prior Publication Data

US 2002/0097153 A1 Jul. 25, 2002

(51) Int. Cl.[7] ............................................. G08B 13/14
(52) U.S. Cl. ..................... 340/572.5; 340/572; 343/741
(58) Field of Search .............................. 340/572.5, 572, 340/572.4; 343/741, 818; 455/13.3

(56) References Cited

U.S. PATENT DOCUMENTS

| | | | |
|---|---|---|---|
| 4,021,705 A | * 5/1977 | Lichtblau | 361/402 |
| 4,857,893 A | 8/1989 | Carroll | 340/572 |
| 5,276,431 A | 1/1994 | Piccoli et al. | 340/572 |
| 5,337,063 A | * 8/1994 | Takahira | 343/741 |
| 5,574,470 A | 11/1996 | De Vall | 343/895 |
| 5,682,143 A | 10/1997 | Brady et al. | 340/572 |
| 5,734,327 A | * 3/1998 | Batterink et al. | 340/572 |
| 5,781,110 A | * 7/1998 | Habeger, Jr. et al. | 340/572 |
| 5,821,525 A | * 10/1998 | Takebayashi | 235/492 |
| 5,926,094 A | 7/1999 | Mamou | 340/572.3 |
| 6,028,564 A | * 2/2000 | Duan et al. | 343/818 |
| 6,091,332 A | 7/2000 | Eberhardt et al. | 340/572.1 |
| 6,100,804 A | 8/2000 | Brady et al. | 340/572.7 |
| 6,198,381 B1 | 3/2001 | Turner et al. | 340/10.1 |
| 6,210,995 B1 | * 4/2001 | Brintzinger et al. | 438/132 |

* cited by examiner

Primary Examiner—Benjamin C. Lee
Assistant Examiner—Phung T Nguyen
(74) Attorney, Agent, or Firm—Baker Botts L.L.P.

(57) ABSTRACT

A radio frequency identification tag having a step-tunable inductor for tuning a parallel resonant antenna circuit of the radio frequency identification tag to a desired frequency. The step-tunable inductor comprises a plurality of branches in which each branch is adapted for adjusting the step-tunable inductor to a desired inductance value for resonating the parallel antenna circuit to a carrier frequency of a tag interrogator/reader.

33 Claims, 14 Drawing Sheets

INDUCTIVELY TUNABLE ANTENNA FOR A RADIO FREQUENCY IDENTIFICATION TAG

RELATED PATENT APPLICATION

This application is related to commonly owned U.S. patent application Ser. No. 09/728,190 entitled "RADIO FREQUENCY IDENTIFICATION TAG ON A SINGLE LAYER SUBSTRATE" by Youbok Lee, Lee Furey and Roger St. Amand, and is hereby incorporated by reference for all purposes.

BACKGROUND OF THE INVENTION

1. Field of the Invention

This invention relates generally to radio frequency identification tags, and more particularly, to inductively tunable antenna circuit for a radio frequency identification tag.

2. Description of the Related Technology

Radio frequency identification (RFID) tags have been used in managing inventory, electronic access control, security systems, automatic identification of cars on toll roads, electronic article surveillance ("EAS"), etc. By utilizing the advantages of radio frequency, RFID tags will work under more hostile environmental conditions than optical bar-code labels since RFID tags are capable of being read through non-metallic substances such as paint, water, dirt, dust, human bodies, concrete, and even through the tagged item itself.

RFID tags are used in conjunction with a radio frequency tag reader ("Interrogator") which transmits a radio frequency ("RF") carrier signal and detects data signals from the RFID tag. Passive RFID tags do not use external power sources, rather they use incoming RF carrier signals from the reader ("Interrogator") as a power source. The passive RFID tag is activated by a DC voltage that is developed as a result of rectifying the incoming RF carrier signal. Once the RFID tag is activated, it transmits the information (data) stored in its memory register.

A typical RFID tag comprises a silicon integrated circuit (IC) and an antenna circuit. The silicon IC may include an RF (or AC) rectifier that converts RF (or AC) voltage to DC voltage, a modulation circuit that is used to transmit stored data to a reader ("Interrogator"), a memory circuit that stores information, a logic circuit that controls overall function of the device, etc. The antenna circuit for a typical RFID tag may be formed by a parallel resonant LC circuit, where L is inductance and C is capacitance, as illustrated in FIG. 1.

A limiting factor of the RFID application is its reading range, which is defined as the communication operating distance between the reader and tag. The reading range of a typical RFID tag may be less than one meter. In order to maximize the reading range, the RFID tag's antenna circuit must be tuned precisely to the carrier signal so that the voltage across the antenna circuit is maximized. The degree of preciseness of the tuning circuit is related to the spectrum width of the reader's carrier signal. For example, the Federal Communication Commission regulates the RFID tag devices spectrum to 13.56 MHz±7 KHz. Therefore, the reader must transmit the 13.56 MHz carrier signal within ±7 KHz bandwidth. To receive this signal, the tag's antenna circuit must be narrowly tuned to the 13.56 MHz±7 KHz signal. For 13.56 MHz application, the inductance L is typically formed by printed, etched, or wired circuit (FIG. 1 shows various prior art antenna circuits for RFID.). A typical value of the inductance for this frequency band (13.56 MHz) is a few hundred nanohenries to a few microhenries. A fixed chip capacitor, silicon capacitor, or parasitic capacitor that is formed by the tag itself is typically used for the capacitor. These L and C values have wide variations in tolerance. Therefore a tuning circuit is often needed to compensate for the tolerance variations of these L and C components. The tuning of an LC resonant circuit can be accomplished by either adjusting the L or C component values.

A typical passive RFID tag utilizes an induced antenna coil voltage for operation. This induced AC voltage is rectified and results in a DC voltage. As the DC voltage reaches a certain level, the RFID device starts operating. By providing an energizing RF signal, an RFID reader can communicate with a remotely located RFID device that has no external power source such as a battery. Since the energizing and communication between the reader and tag is accomplished through antenna circuit, it is important that the RFID device be equipped with a properly tuned antenna circuit for successful RFID applications. An RF signal can be radiated or received effectively if the linear dimension of the antenna is comparable with the wavelength of the operating frequency. However, the wavelength at 13.56 MHz, for example, is 22.12 meters. Therefore, it is difficult to form a true full size antenna in a limited space, and this is true for most RFID applications. Alternatively, a small LC loop antenna circuit that resonates at the operating frequency is used.

The small LC loop antenna may comprise a spiral coil and a capacitor, the spiral coil is formed by n-turns of wire, or n-turns of printed or etched inductor on dielectric substrate. FIG. 3 illustrates an LC antenna circuit having a spiral inductor on dielectric substrate. The inductor (b) may be formed by n-turns of wire and the inductor (a) may be formed by printed circuit techniques, etc.

Generally, the RFID tag antenna may be tuned using trimming capacitors. This capacitive tuning method, however, requires the capacitor electrodes (metallization) to be on both the top and bottom sides of the substrate, which in turn requires the tag's antenna circuit to be formed with a double sided circuit. A double-sided circuit structure generally requires a more complex manufacturing process than does a single sided circuit which results in a higher cost product.

Therefore, what is needed is an inexpensive, simple and effective way of tuning an RFID tag antenna circuit without requiring a double sided circuit structure for the antenna circuit.

SUMMARY OF THE INVENTION

The invention overcomes the above-identified problems as well as other shortcomings and deficiencies of existing technologies in RFID applications by changing the inductance of a spiral coil of an RFID tag antenna circuit disposed on a circuit substrate. The variable inductance spiral coil on the substrate comprises a step-tunable inductor for frequency tuning of the antenna circuit of the RFID tag. The step-tunable inductor may resonant with a discrete capacitor connected to the inductor, or a capacitor that is part of and internal to a semiconductor integrated circuit RFID tag device. A series resonant circuit antenna is also contemplated and within the scope of the present invention.

The substrate may be, for example but not limited to; PET, Mylar, paper, plastic, Kapton, ceramic, polyimide, polyvinylchloride (PVC), etc., and combinations thereof. A RFID tag device semiconductor integrated circuit die is attached to the substrate, preferably on the same side as the antenna inductor and is electrically connected thereto. Connection to the RFID tag device semiconductor integrated circuit die may be by wire bonding, flipchip (C4), etc., or any combination thereof. The dielectric substrate may also have other connection pads that may be used for testing and/or programming the RFID tag. The coil material is electrically conductive and may be, for example but not limited to; metal such as copper, aluminum, gold, plated metal, electrically conductive organic and inorganic materials, etc.

In one embodiment of the invention, a parallel resonant circuit antenna is formed on only one side of a substrate. The parallel resonant circuit antenna, which includes a step-tunable inductor, may be printed as metallic traces on the one side of the substrate. The step-tunable inductor is adapted for adjustment to a desired inductance value for resonating the tuned frequency of the parallel resonant antenna circuit of the RFID tag.

In yet another embodiment of the invention, the step-tunable inductor consists of various inductive tuning branches, i.e., these branches are capable of being trimmed to adjust the step-tunable inductor to a desired inductance value. In other words, the length and spacing of the step-tunable inductor can be adjusted by trimming the branches. The branches may be trimmed by laser, ablation or mechanically cutting.

In another embodiment, fusible conductive links may be used to trim the branches that comprise the step-tunable inductor. Series connected turns may be disconnected by causing a respective conductive link fuse to open upon application of a current above the carrying capacity of the fuse. Parallel connected branches may also be trimmed by having different current carrying capacity sized fuses open upon a specific value current being applied to the parallel connected branch-fuses. Different value resistors may be connected in series with each of the parallel connected branch-fuses.

In yet another embodiment, tuning inductance is switched in and out using circuits of the RFID tag device itself. Fusible links on the silicon semiconductor die of the RFID tag device may be used to disconnect the inductive branches. Transistor switches may be used to do the same function. The transistor switches may be controlled by fusible links, non-volatile memory and the like. The transistor switches may also be programmably enabled and disabled by electronic circuits in the RFID tag device, such as for example but not limited to a microcontroller. Auto tuning of the RFID tag antenna circuit may also be performed by using transistor switches controlled by a frequency tracking circuit. The frequency tracking circuit may be effectively utilized for varying RFID tag antenna resonance conditions so as to enhance the range and thus area of usability for the RFID tag.

Features and advantages of the invention will be apparent from the following description of presently preferred embodiments, given for the purpose of disclosure and taken in conjunction with the accompanying drawings.

Figure 1:
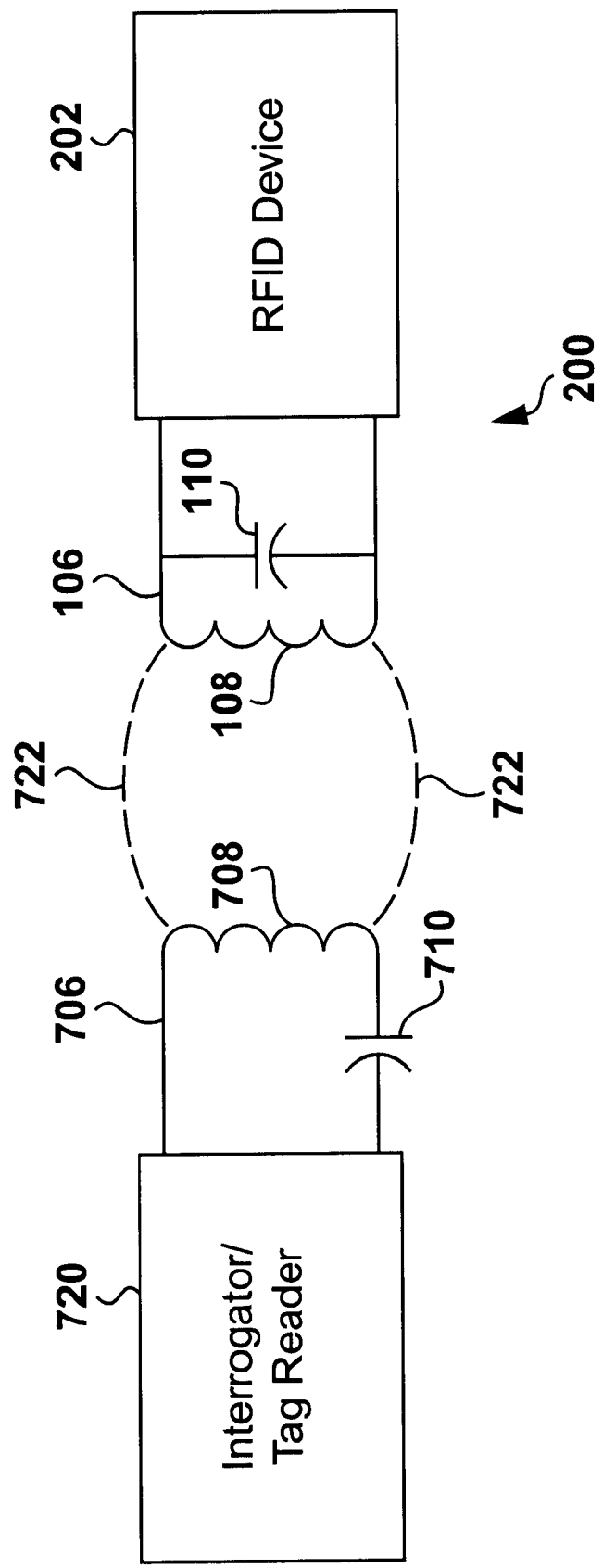
FIG. 1 illustrates a schematic block diagram of an RFID tag system that includes both a radio frequency reader (Interrogator) and a RFID tag.

While the present invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

The present invention is directed to a step-tunable inductor for tuning a parallel resonant antenna circuit of a radio frequency identification ("RFID") tag. The RFID tag may be fabricated on a single sided substrate for increased reliability and reduced manufacturing costs. Easy and precise tuning of the step-tunable inductor permits using wider tolerance capacitors, which are less expensive, thus further reducing the cost of manufacture. In addition, RFID semiconductor integrated circuit having a built-in on-chip capacitor may be used with the present invention for even further simplification in manufacture and subsequent cost reduction.

Referring now to the drawings, the details of preferred embodiments of the invention are schematically illustrated. Like elements in the drawings will be represented by like numbers, and similar elements will be represented by like numbers with a different lower case letter suffix.

FIG. 1 illustrates an RFID system that includes a radio frequency (RF) generator/interrogator/tag reader 720 and an RFID tag 200. The tag reader 720 has a tuned circuit 706 comprising an inductor 708 and a capacitor 710 connected in series. RF generator/interrogator/tag reader 720 produces continuous wave (CW) RF power across the turned circuit 706. This CW RF power is electro-magnetically coupled by alternating current action to a parallel resonant circuit antenna 106 of the RFID tag 200. The coupled CW RF electro-magnetic power is generally represented by the numeral 722. The RFID tag 200 has a power converter circuit that converts some of the coupled CW RF electromagnetic power 722 into direct current power for use by the logic circuits of the RFID tag integrated circuit device 202 (not illustrated).

When the parallel resonant circuit antenna 106 of the RFID tag 200 is in proximity to the tuned circuit 706 of the RF generator/interrogator/tag reader 720, it develops an AC voltage across the tuned circuit 106. The AC voltage across the parallel resonant circuit antenna 106 is rectified and when the rectified voltage becomes sufficient enough to activate the RFID tag integrated circuit device 202, the RFID tag 200 is activated and starts sending stored data in its memory register by modulating the incoming RF carrier signal 722 of the reader 720. The interrogator/tag reader 720 detects these modulated signals and converts them into a detected serial data word bitstream of on/off pulses representative of the information from the RFID tag 200.

Figure 2:
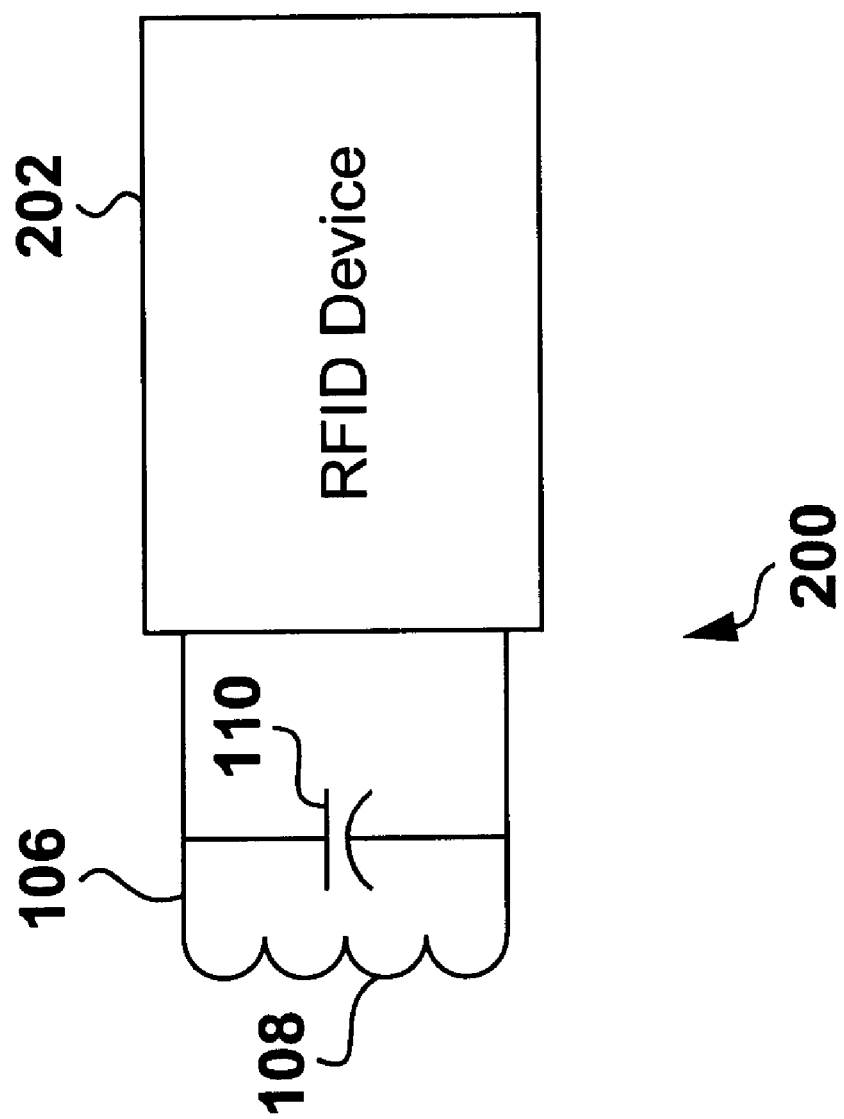
FIG. 2 illustrates a schematic block diagram of an embodiment of an RFID tag with a parallel resonant circuit antenna.
Figure 3:
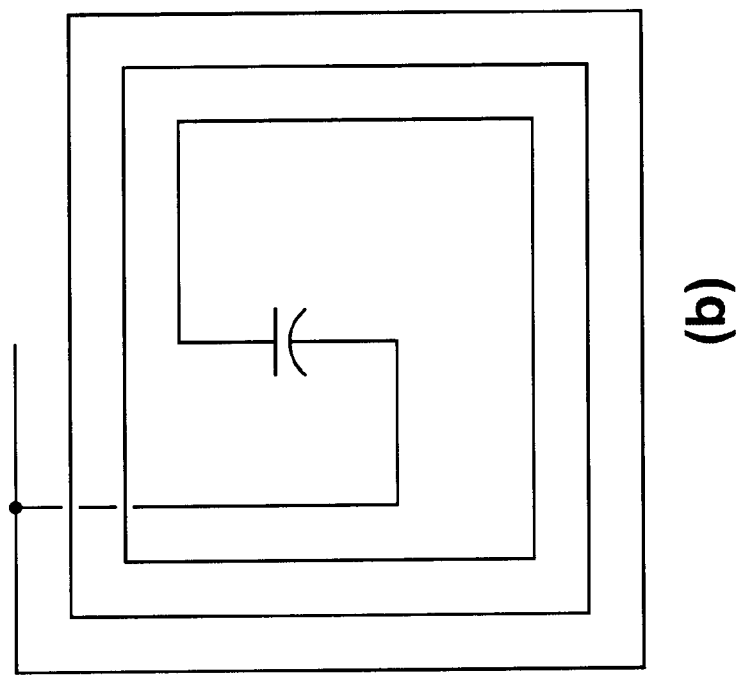
FIG. 3 illustrates schematic diagrams of prior art parallel resonant (LC) antenna circuits for an RFID tag.
Figure 3:
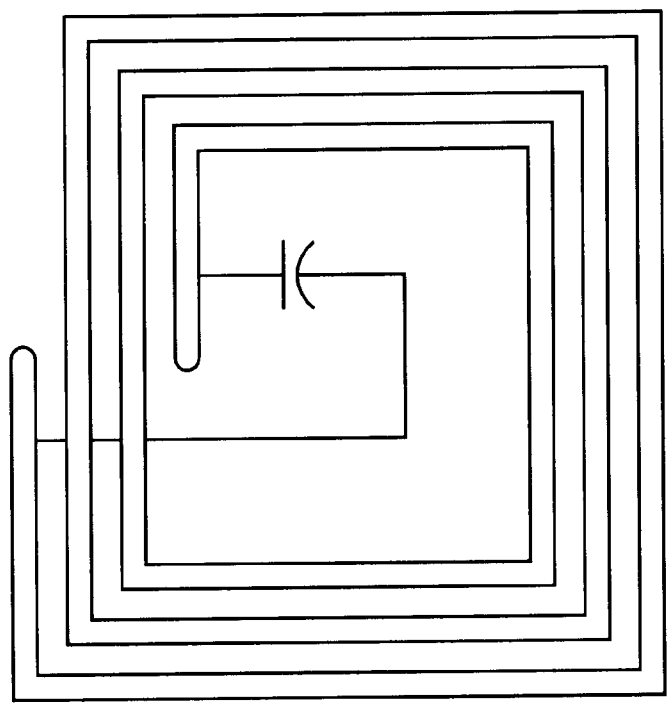

FIG. 2 illustrates a schematic block diagram of an RFID tag 200 with a parallel resonant circuit antenna 106. The parallel resonant circuit antenna 106 of the RFID tag 200 comprises an inductor 108 and a capacitor 110. The RFID device 202 is a semi-conductor integrated circuit device that includes electronic logic circuits for radio frequency identification purposes.

The resonant frequency of the parallel resonant circuit antenna 106 of the RFID tag 200 is determined by a unique combination of inductance and capacitance. Generally, this resonant frequency, $f_o$, is determined by equation (1):

$$f_o = \frac{1}{2\pi\sqrt{LC}} \quad \text{(Hz)} \qquad \text{Eq. (1)}$$

where L is inductance in Henrys and C is capacitance in Farads.

Inductance Calculation for a Spiral Inductor

Equations for calculating the inductance of an inductor are well known to one of ordinary skill in the art and may be found, for example, in the following paper: Reference [1] H. M. Greenhouse, "Design of Planar Rectangular Microelectronic Inductors," IEEE Transactions on Parts, Hybrids and Packaging, Vol. PHP-10, No. 2, June 1974; and the following textbook: reference [2] Keith Henry, "Radio Engineering Handbook," McGraw-Hill Book Company, New York, N.Y., 1963, both incorporated by reference herein. These equations are used to estimate the resulting inductance value for a given shape of an inductor.

Figure 4:
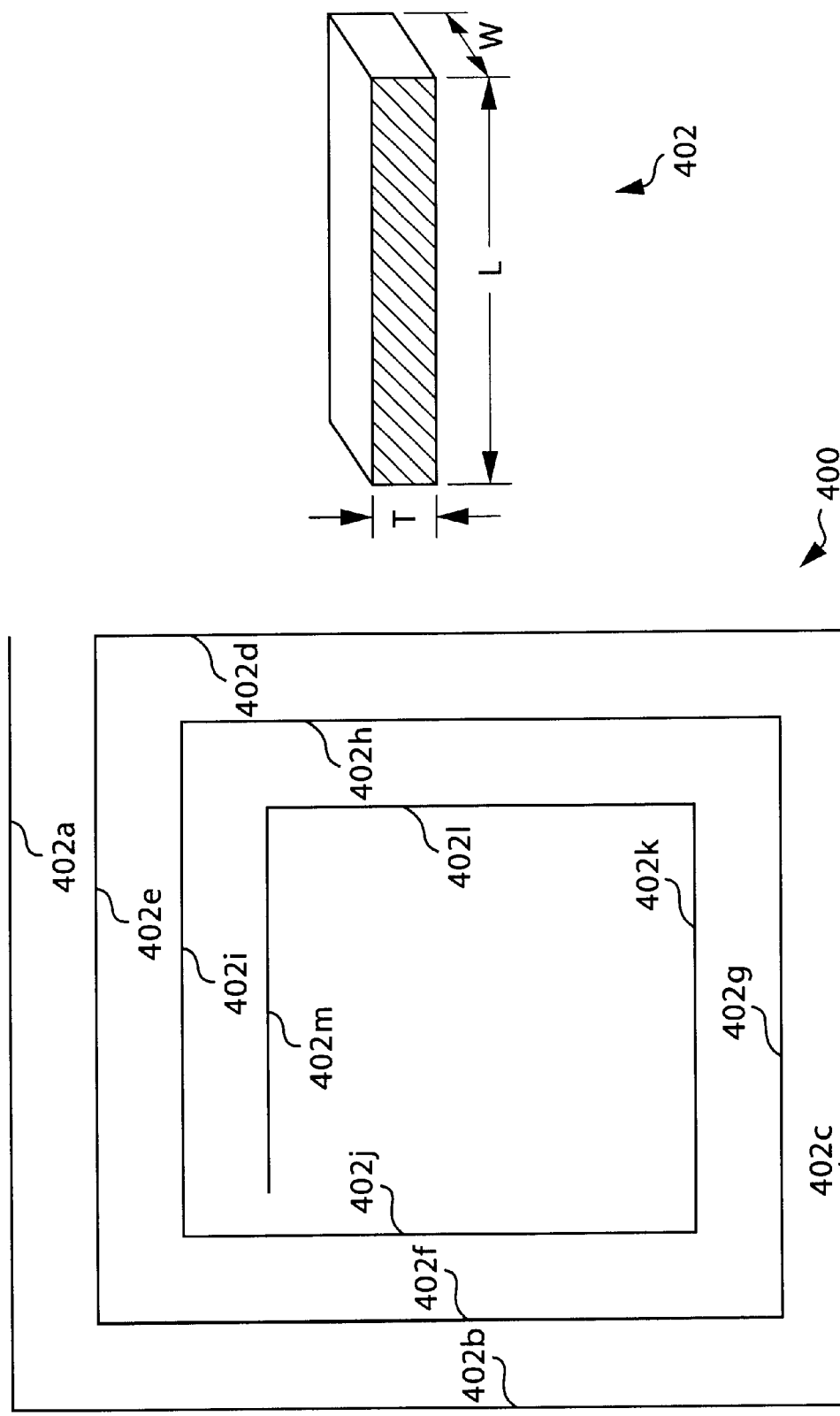
FIG. 4 illustrates a schematic of an example of an etched spiral inductor, and a three dimensional portion of a segment thereof, that may be used in an RFID tag.

Referring now to FIG. 4, a schematic of an example of an etched spiral inductor, and a schematic cross section of a segment thereof, that may be used in an RFID tag is illustrated. The total inductance of an inductor with any shape is equal to the sum of the self-inductance of each of the individual segments 402a-402m plus the sum of each mutual inductance between each of these segments. This relationship is express in equation (2):

$$L_T = L_o + M_+ - M_- \qquad \text{Eq. (2)}$$

where $L_T$ is the total inductance, $L_o$ is the sum of the self-inductance of all individual segments, $M_+$ is the sum of all positive mutual inductance and $M_-$ is the sum of all negative mutual inductance. The derivation of equation (2) above is detailed in equation (3) below.

The self-inductance is a function of length, width and thickness of the segment 402 (conductor). For a straight segment conductor with rectangular cross-sections, as illustrated in FIG. 4, the inductance may be calculated, according to reference [1] above, by equation (3):

$$L_x = 0.002 l \left\{ l_n \left( \frac{2l}{w+t} \right) + 0.50049 + \frac{(w+t)}{3l} \right\} \qquad \text{Eq. (3)}$$

where l is the length of the segment conductor in centimeters, w is the width of the segment conductor and t is the thickness of the segment conductor in centimeters, and $L_x$ is in nanohenrys.

As illustrated in equation (3), the inductance of a straight conductor increases with its length, but decreases with its width and thickness.

The mutual inductance of the multiple turn spiral coil 400 (FIG. 4) is due to the magnetic flux linkage between each segment conductor due to current flow. For example, mutual inductance between two segments is positive when current flow in two conductors is in the same direction, and negative when current flow is in an opposite direction. The absolute value of the mutual inductance between the two conductors is a function of the length of the conductors and geometric mean distance between them. For example, higher mutual inductance occurs with longer conductors and smaller spacing between them. Therefore it is possible to change the inductance value by trimming the length or spacing between segments.

Tuning of the Inductor

Figure 5:
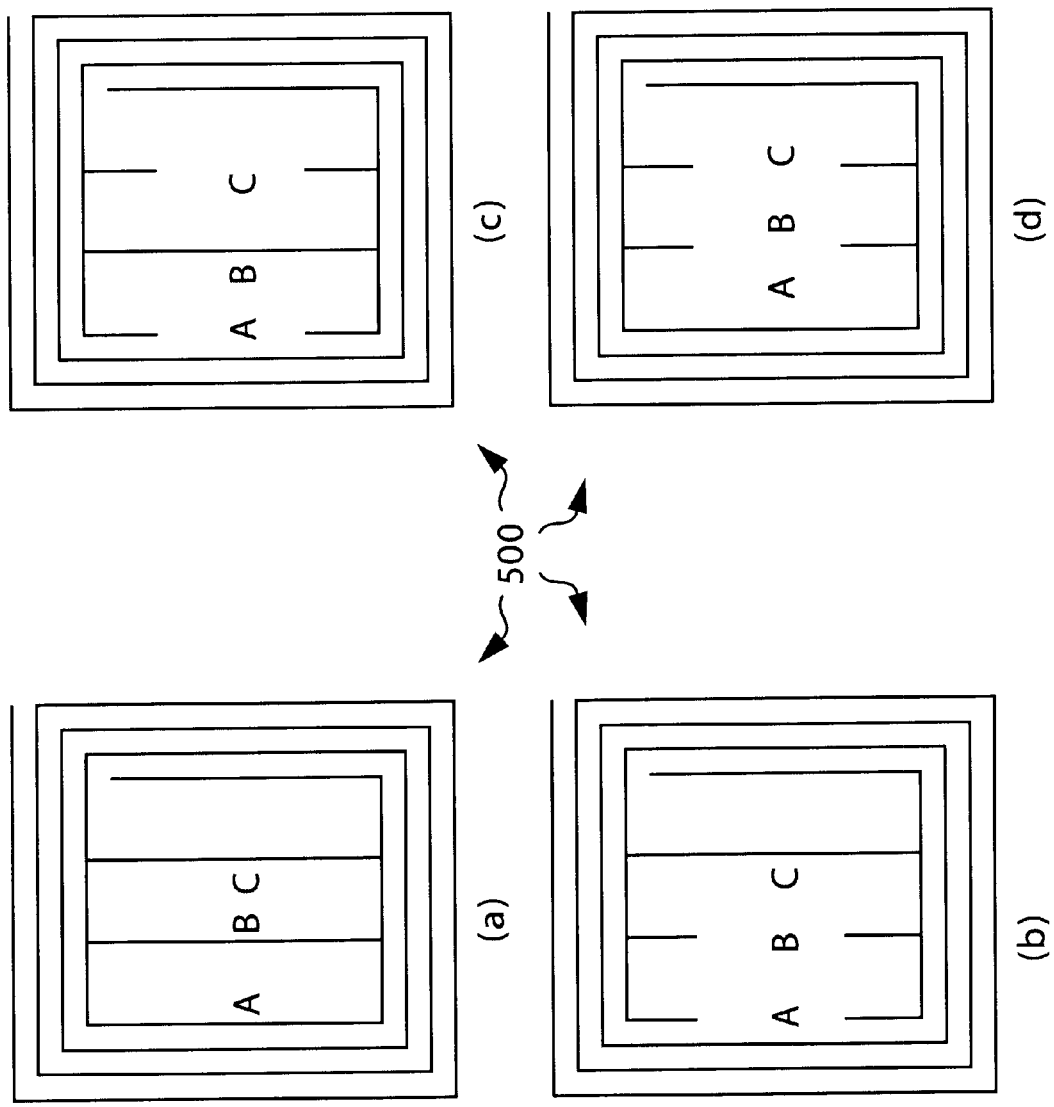
FIG. 5 illustrates schematic diagrams of an embodiment of the present invention comprising a step-tunable inductor having trimming branches.

Referring to FIG. 5, schematic diagrams of various connections for an embodiment of the present invention comprising a step-tunable inductor having trimming branches are illustrated. A spiral inductor represented by the numeral 500 has tuning branches A, B and C. The self inductance of a segment, or the mutual inductance with adjacent conductors will vary if two of the branches are cut off. Therefore, the total inductance of the circuit will be changed by trimming the branches A, B and C in the inductor 500. Various trimmed examples are illustrated in FIGS. 5(b)-(d). For a given condition, example (d) of FIG. 5 has the largest total inductance compared to the examples of (b) and (c). Example (b) has the smallest total inductance value among the examples (b)–(d). The trimming (cutting off of trimming branches) causes changes in geometric parameters of the coil of the inductor 500, such as segment length and spacing between the segments, thereby changing the total inductance.

Figure 6:
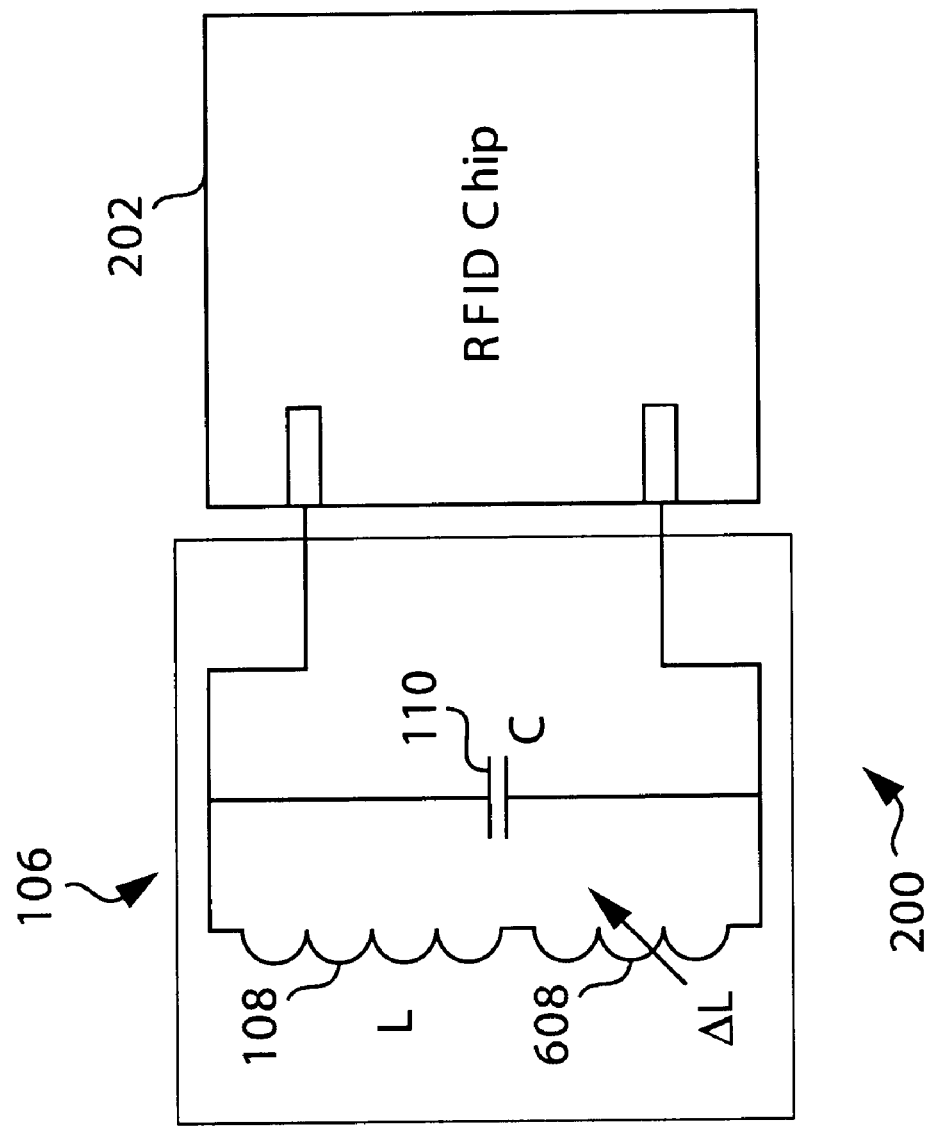
FIG. 6 illustrates schematic diagram of an inductively tuned antenna circuit RFID tag, according to the present invention.

FIG. 6 illustrates a schematic block diagram of an inductively tuned antenna circuit RFID tag, according to embodiments of the invention. The parallel resonant antenna circuit 106 comprises a fixed capacitor 110, a fixed inductor 108 and a step adjustable inductor 608. The capacitor 110 may be part of the RFID device 202. The inductance of the step adjustable inductor 608 is adjusted to resonate the antenna circuit 106 to a desired frequency. Adjustment of the step adjustable inductor 608 is done by cutting the appropriate trimming branches for a desired change in inductance.

Figure 7:
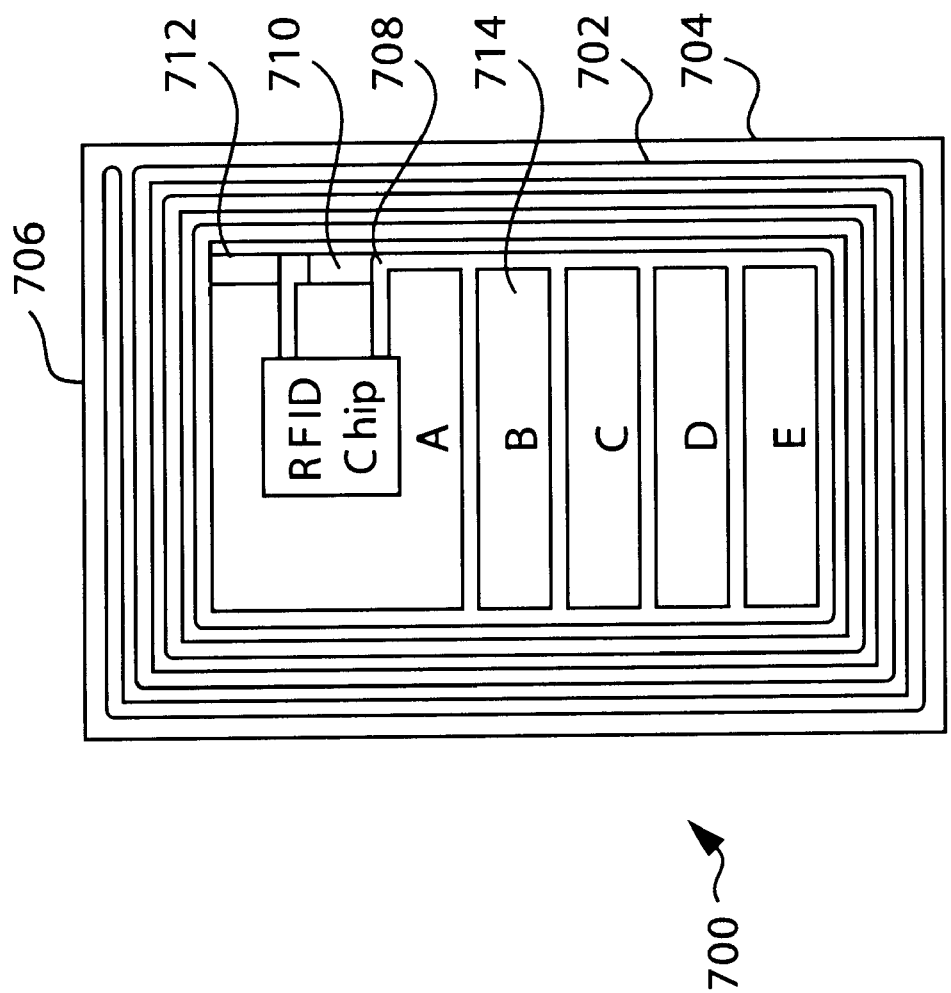
FIG. 7 illustrates a schematic plan view of an embodiment of the RFID tag illustrated schematically in FIG. 6.

Referring to FIG. 7, a schematic plan view of an embodiment of an RFID tag 700 is illustrated. The antenna inductor 702 illustrated has four spiral turns which are etched from conductive material such as metal deposited on a dielectric (insulated) substrate 704. The first spiral turn starts from point 706 and the fourth spiral turn ends at point 708. Jumper 712 connects point 706 to the RFID device 716 and fixed value capacitor 710. Segments A, B, C, D and E are trimming branches. The total geometric parameters (physical dimension) of the inductor 702, or the inner diameter, of the inductor 702 changes by cutting off all but one of the trimming branches. Each of the segments A, B, C, D and E represent a different inductance value of the inductor 702. This allows the inductance value of the inductor 702 to be adjusted by selectively cutting all but one of these segments. Thus, the inductor 702 can be tuned to a desired frequency in combination with a fixed value capacitor 710 on the substrate 704 or integrated into the RFID chip 716.

Figure 9:
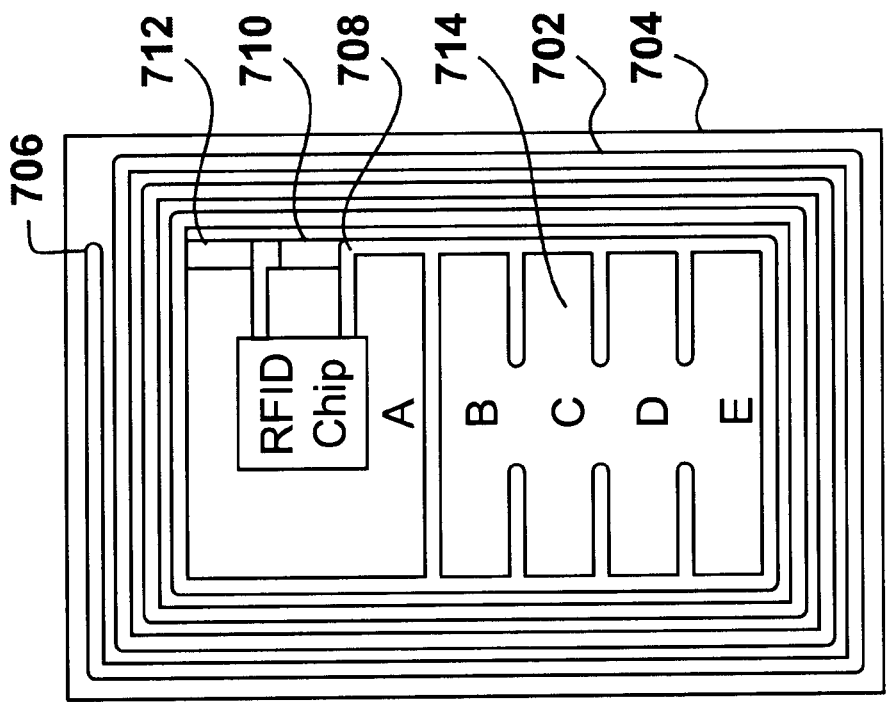
FIGS. 8 and 9 illustrate schematic plan views of the embodiment of the RFID tag of FIG. 7 having different inductance values.
Figure 8:
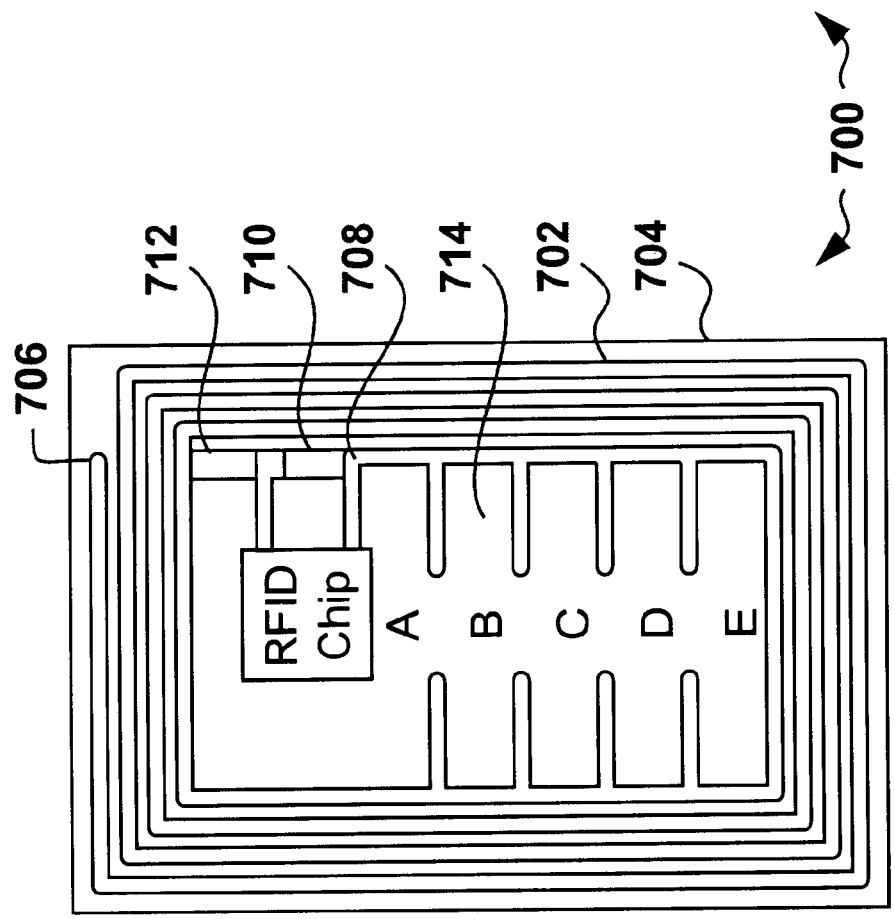

FIG. 8 illustrates the trimming branches A–D cut off, and branch E intact. The inductor 702 is formed by segments starting from point 706 and ends at point 708 through branch E. This results in a maximum inductance value for the inductor 702. FIG. 9 illustrates the trimming branches B–E cut off, and branch A intact. The inductor 702 is formed by segments starting from point 706 and ends at point 708 through branch A. This results in a minimum inductance value for the inductor 702. The inductance value of the inductor 702 may thus be adjusted from a minimum to a maximum value by selectively cutting all but one of the trimming branches A–E.

Figure 10:
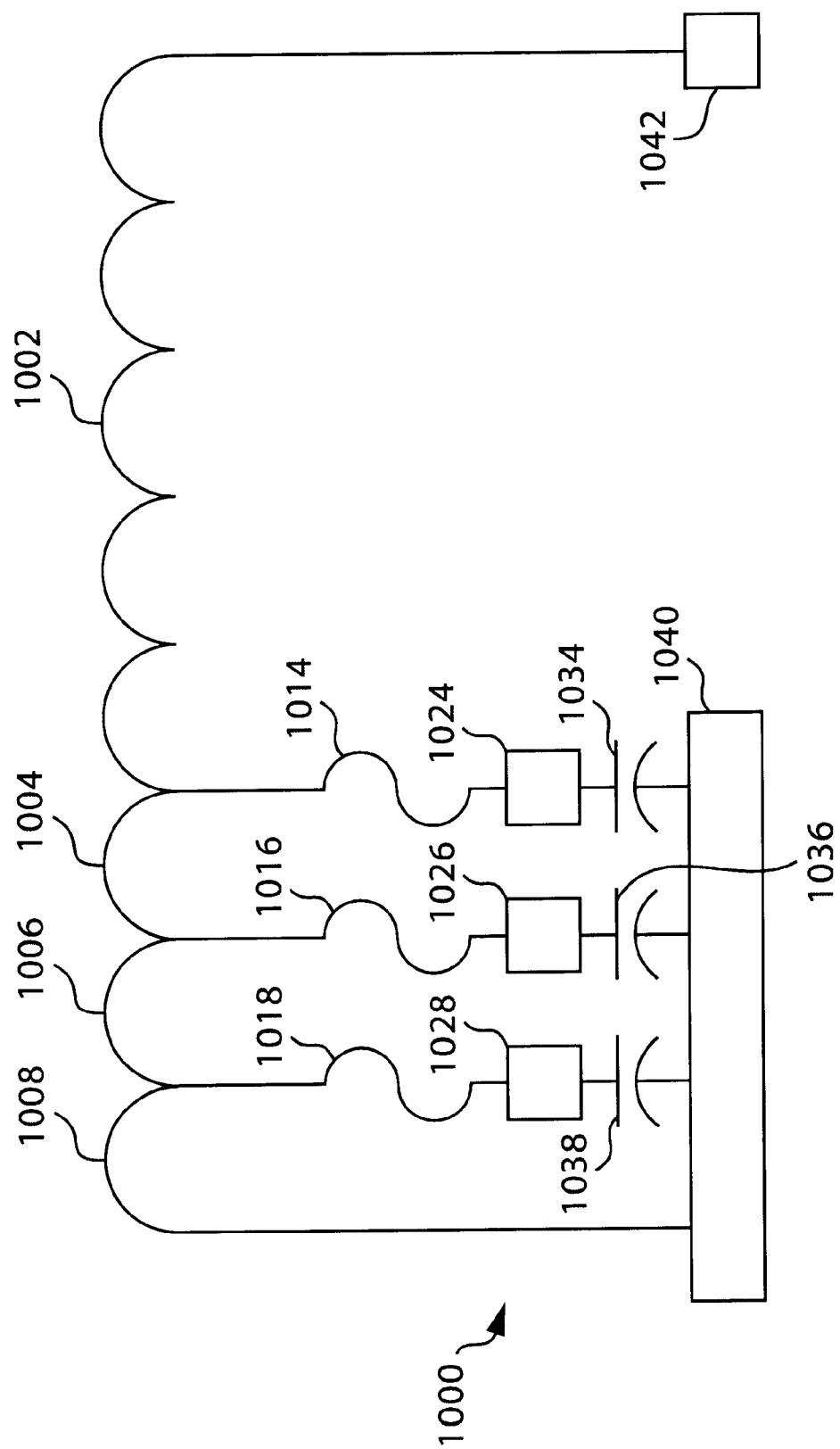
FIG. 10 illustrates a schematic diagram of an embodiment of an inductor having fuse link selection of series connected turns of the inductor.
Figure 10A:
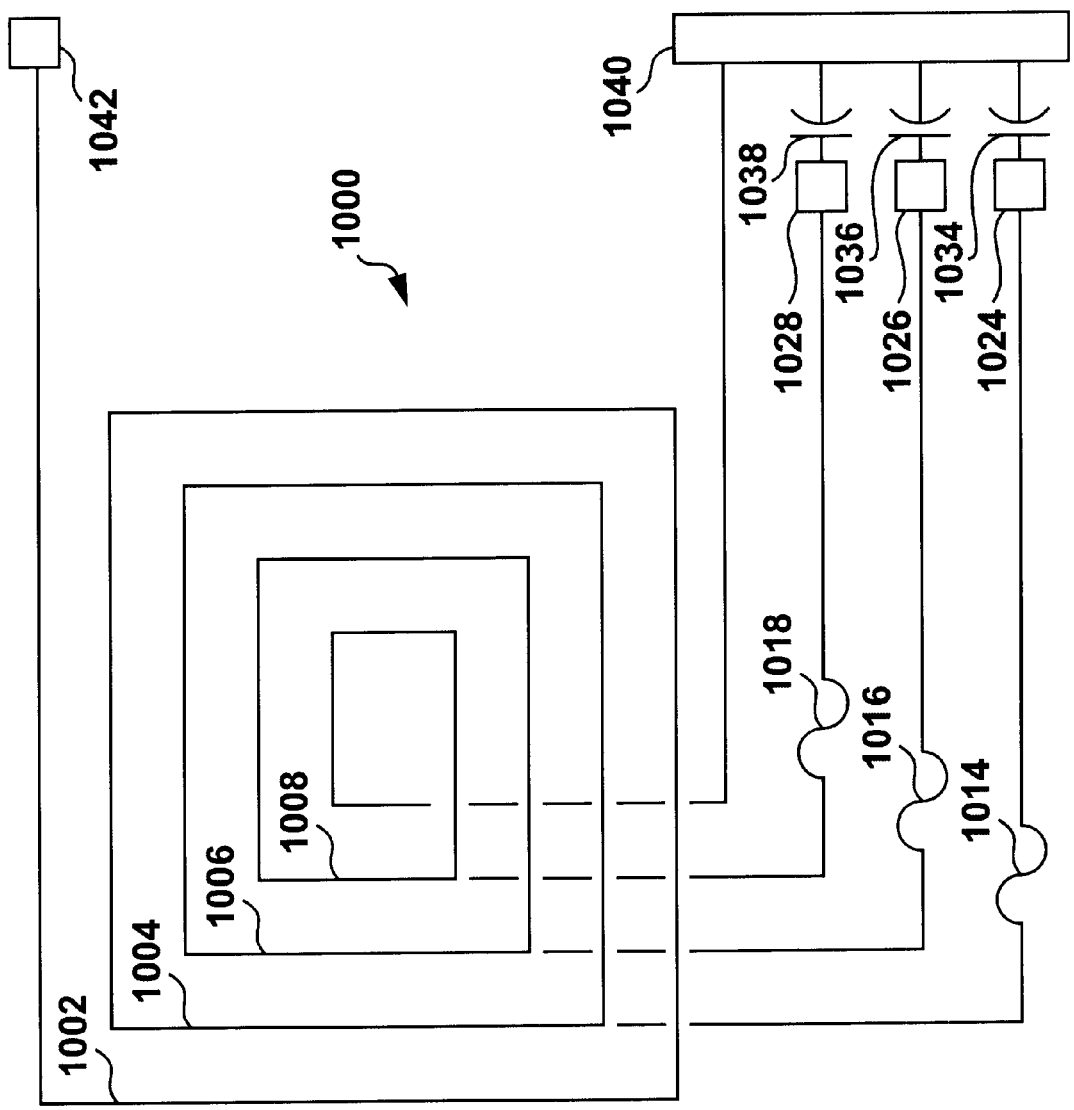
FIG. 10A illustrates a schematic plan view of the inductor of FIG. 10.

FIG. 10 illustrates a schematic diagram of an embodiment of an inductor having fuse link selection of series connected coil turns of the inductor. FIG. 10A illustrates a schematic plan view of the inductor of FIG. 10. The inductor, generally represented by the numeral 1000, comprises a plurality of series connected coil turns. The coil 1000 comprises a main inductor 1002, and a plurality of series connected turns 1004, 1006 and 1008 which may be initially shorted together by fuse links 1014, 1016 and 1018, respectively. The fuse link 1014 shorts together coil turns 1004, 1006 and 1008; the fusible link 1016 shorts together coil turns 1006 and 1008; and the fuse link 1018 shorts together coil turn 1008. The inductance value of the inductor 1000 may be increased by causing selected fuse links to open, thereby adding the inductance of one or more of the coil turns 1004–1008 to the inductance of the main inductor 1002. The capacitors 1034, 1036 and 1038 are merely direct current blocking capacitors and appear as radio frequency "short circuits" at the operating frequencies of interest.

Connection nodes 1024, 1026, 1028 and 1040 are adapted for application of programming currents to the fusible links 1014, 1016 and 1018. For example, when the addition of just one coil turn 1004 is desired, the fuse link 1014 is opened by applying sufficient current between nodes 1024 and 1040 to melt or blow open the fuse link 1014. When the addition of two coil turns 1004 and 1006 are desired, the fuse links 1014 and 1016 are opened by applying sufficient current between nodes 1024 and 1040 and nodes 1026 and 1040 to melt or blow open the fuse links 1014 and 1016, respectively. When the addition of three coil turns 1004, 1006 and 1008 are desired, the fuse links 1014, 1016 and 1018 are opened by applying sufficient current between nodes 1024 and 1040, 1026 and 1040, and 1028 and 1040 to melt or blow open the fuse links 1014, 1016 and 1018, respectively.

Figure 11:
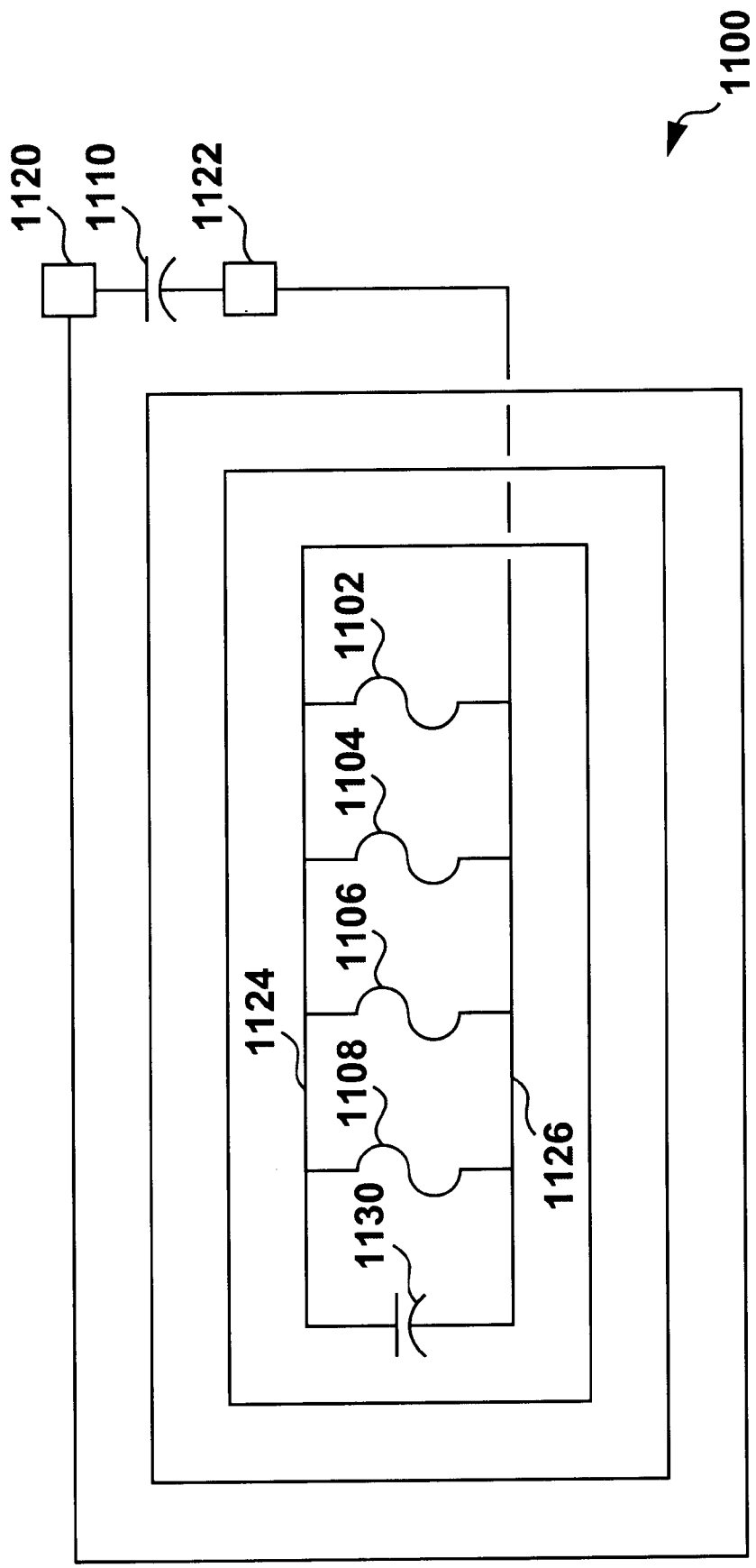
FIG. 11 illustrates a schematic diagram of another fuse link controlled inductor embodiment of the invention.

FIG. 11 illustrates a schematic diagram of another fuse link controlled embodiment of the invention. The antenna inductor, generally represented by the numeral 1100 has, for example but is not limited to, four spiral turns which may be etched from conductive material such as metal deposited on a dielectric (insulated) substrate (not illustrated). Four segments comprising fuse links 1102, 1104, 1106 and 1108 function as trimming branches as described above. The total geometric parameters (physical dimension) of the inductor 1100, or the inner diameter, of the inductor 1100 changes by opening one or more of the fuse link trimming branches (fuse links 1102, 1104, 1106 and 1108). This allows the inductance value of the inductor 1100 to be selectively adjusted. Whereby the inductor 1100 can be tuned to a desired resonant frequency in combination with the fixed value capacitor 1110. The length of the inner diameter coil turn is made up of segments 1124 and 1126, and DC blocking capacitor 1130. Each of the fuse links 1102, 1104, 1106 and 1108 represents a different inductance value of the inductor 1100. Each of the fuse links 1102, 1104, 1106 and 1108 require a different value of current to open the respective fuse link. Capacitor 1130 blocks direct current (DC) so that the programming current will flow only through the fuse links 1102, 1104, 1106 and 1108. The lowest value current fuse link is 1102 and the next higher value current is for fuse link 1104, the next is fuse link 1106 and the highest current value is fuse link 1108. By apply an appropriate current value or values to nodes 1120 and 1122, the desired number of fuse links may be opened.

Figure 12:
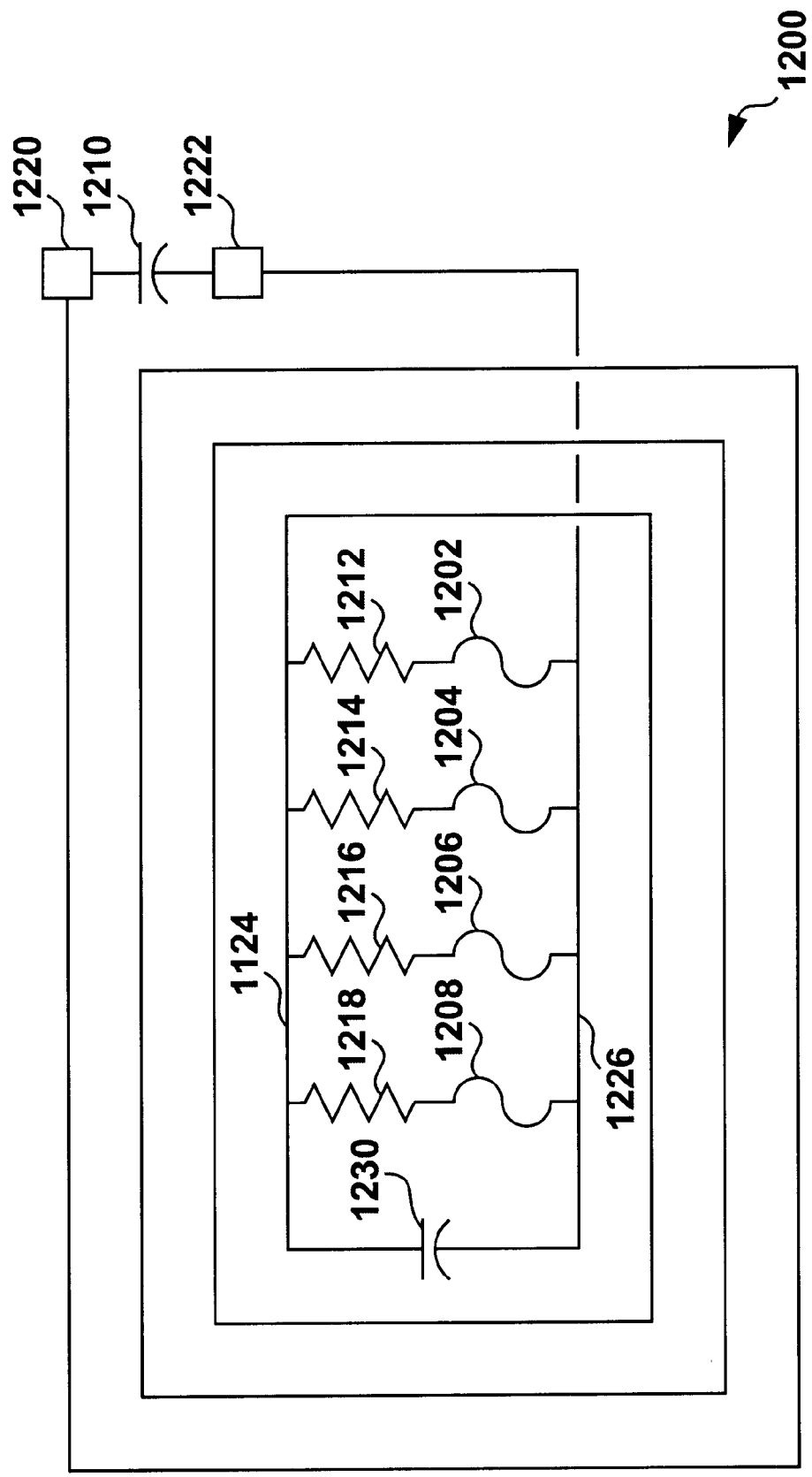
FIG. 12 illustrates a schematic diagram of still another fuse link controlled inductor embodiment of the invention.

FIG. 12 illustrates a schematic diagram of another fuse link controlled embodiment of the invention. The antenna inductor, generally represented by the numeral 1200 has, for example but is not limited to, four spiral turns which may be etched from conductive material such as metal deposited on a dielectric (insulated) substrate (not illustrated). Four segments comprising fuse links 1202, 1204, 1206 and 1208 and resistors 1212, 1214, 1216 and 1218 function as trimming branches as described above. The total geometric parameters (physical dimension) of the inductor 1200, or the inner diameter, of the inductor 1200 changes by opening one or more of the fuse link trimming branches (fuse links 1202, 1204, 1206 and 1208). This allows the inductance value of the inductor 1200 to be selectively adjusted. Whereby the inductor 1200 can be tuned to a desired resonant frequency in combination with the fixed value capacitor 1210. The length of the inner diameter coil turn is made up of segments 1124 and 1126, and DC blocking capacitor 1230. Each of the fuse links 1202, 1204, 1206 and 1208 represents a different inductance value of the inductor 1200. The fuse links 1202, 1204, 1206 and 1208 may all have the same current operating value but the resistors 1212, 1214, 1216 and 1218 have difference values which require a different value of voltage to open the respective fuse link. The higher the value of resistor the lower the current flow for a given current. By making resistor 1218 a higher resistance value than resistor 1216, resistor 1216 a higher resistance value than resistor 1214, and resistor 1214 a higher resistance value than resistor 1212; the fuse link 1202 will open at the lowest voltage value applied between nodes 1220 and 1222. Fuse link 1204 will open at the next voltage value increase, fuse link 1206 will open at the next higher voltage value increase, and fuse link 1208 will open at the highest voltage value applied between nodes 1220 and 1222.

Figure 13:
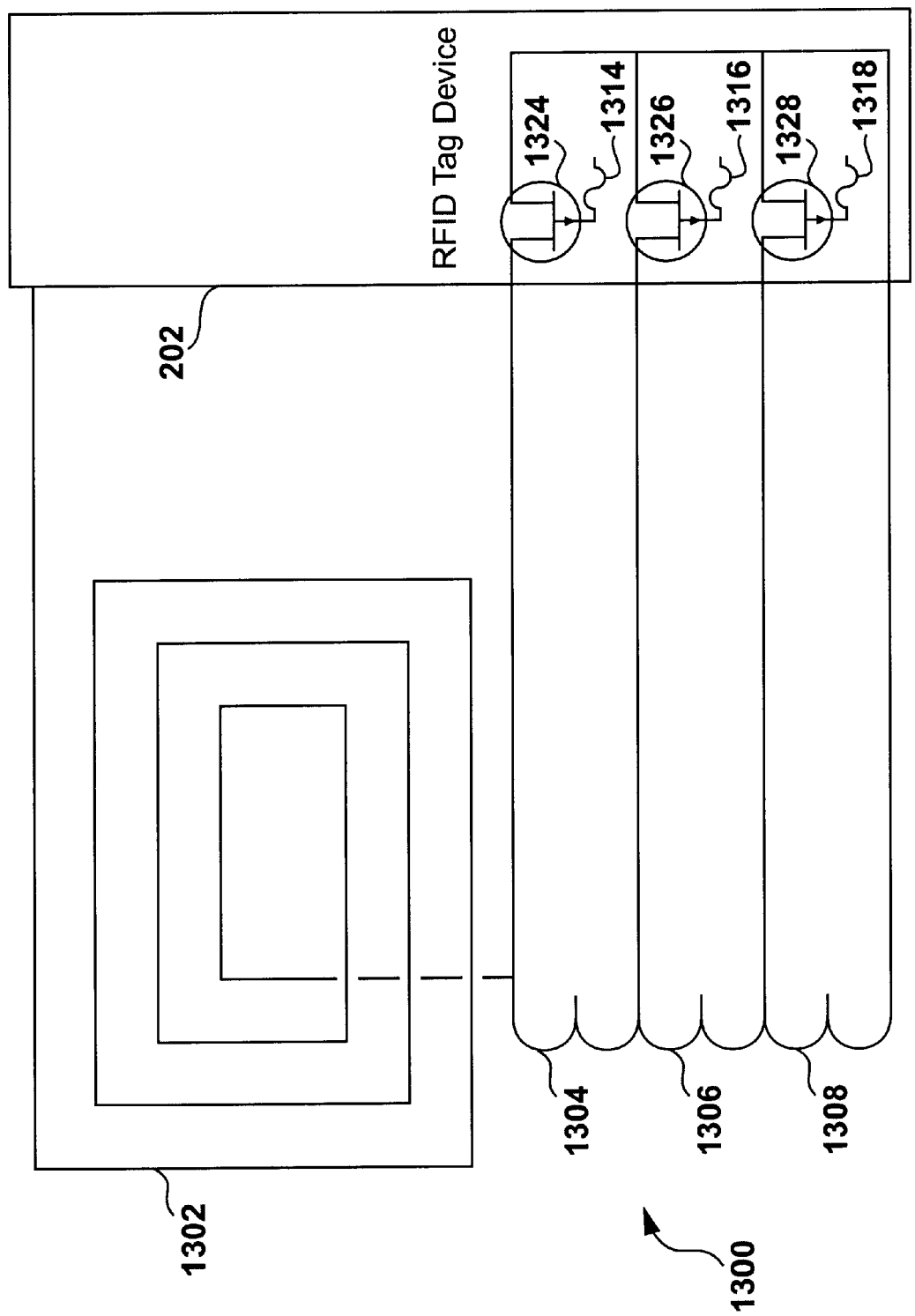
FIG. 13 illustrates a schematic diagram of an embodiment of inductive tuning being controlled by circuits of the semiconductor RFID tag device.

FIG. 13 illustrates a schematic diagram of an embodiment of inductive tuning being controlled by circuits of the semiconductor RFID tag device. An inductor, generally represented by the numeral 1300, comprises a plurality of series connected coil turns. The coil 1300 comprises a main inductor 1302, and a plurality of series connected turns 1304, 1306 and 1308 which may be initially shorted together by transistor switches 1324, 1326 and 1328, respectively. The transistor switches 1324, 1326 and 1328 may be controlled by programmable fuse links 1314, 1316 and 1318, respectively. The transistor switch 1324 shorts together coil turns 1304, 1306 and 1308; the transistor switch 1326 shorts together coil turns 1306 and 1308; and the transistor switch 1328 shorts together coil turn 1308. When all of the transistor switches 1324, 1326 and 1328 are open all of the coil turns 1304, 1306 and 1308 are effectively part of the inductor 1302. The inductance value of the inductor 1300 may be increased by causing selected fuse links to open, thereby adding the inductance of one or more of the coil turns 1304–1308 to the inductance of the main inductor 1302.

Figure 14:
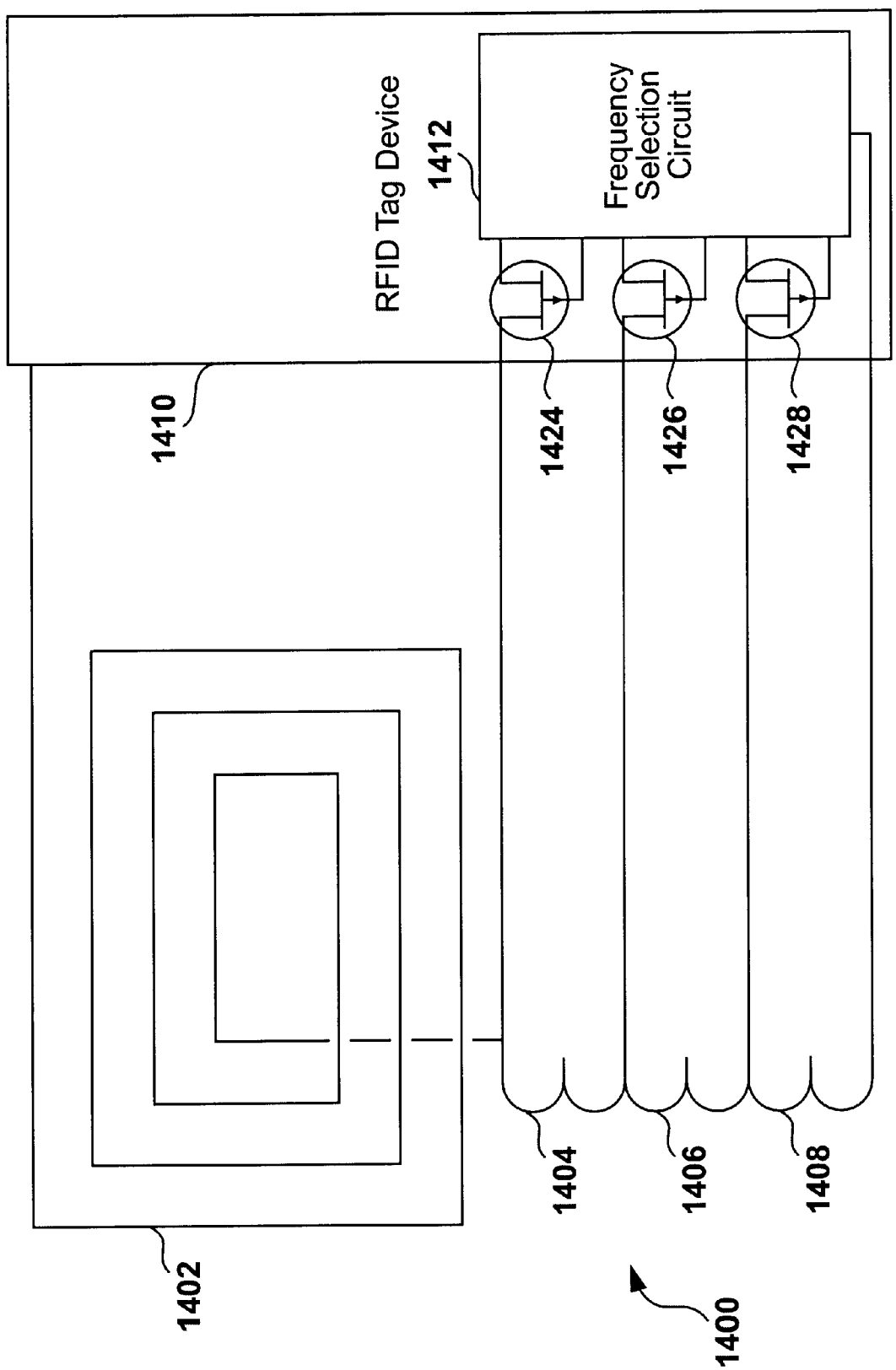
FIG. 14 illustrates a schematic diagram of an automatic tuning embodiment of the invention.

FIG. 14 illustrates a schematic diagram of an automatic tuning embodiment of the invention. An inductor, generally represented by the numeral 1400, comprises a plurality of series connected coil turns. The coil 1400 comprises a main inductor 1402, and a plurality of series connected turns 1404, 1406 and 1408 which may be initially shorted together by transistor switches 1424, 1426 and 1428, respectively. The transistor switches 1424, 1426 and 1428 may be controlled by a frequency selection circuit 1412. The transistor switch 1424 shorts together coil turns 1404, 1406 and 1408; the transistor switch 1426 shorts together coil turns 1406 and 1408; and the transistor switch 1428 shorts together coil turn 1408. When all of the transistor switches 1424, 1426 and 1428 are open all of the coil turns 1404, 1406 and 1408 are effectively part of the inductor 1402. The inductance value of the inductor 1400 may be thereby adjusted so as to tune the parallel resonant circuit of the inductor 1400 and capacitor (not illustrated) to an optimum frequency determined by the frequency determining and optimization circuit 1412. The frequency selection circuit 1412 preferably may be part of the RFID tag device 1410. The RFID tag device may comprise a microcontroller functioning as the frequency selection circuit 1412.

Illustrative embodiments of the invention are described hereinabove. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A radio frequency identification tag, comprising:
    an insulated substrate having a surface;
    a parallel resonant antenna circuit disposed on the surface of said substrate, said parallel resonant antenna circuit having a step-tunable inductor comprising a spiral coil adapted for tuning said parallel resonant antenna circuit to a desired frequency, wherein said step-tunable inductor has trimming branches disposed on the surface of said substrate and entirely inside of said spiral coil, wherein said trimming branches are adapted for adjusting the inductance of said step-tunable inductor; and
    a semiconductor integrated circuit having electronic logic circuits for storing, receiving and transmitting data, said semiconductor integrated circuit being disposed on the surface of said substrate and connected to said parallel resonant antenna circuit.

2. The radio frequency identification tag of claim 1, wherein said step-tunable inductor is a spiral coil disposed on the surface of said substrate.

3. The radio frequency identification tag of claim 1, wherein said trimming branches are controlled by transistors.

4. The radio frequency identification tag of claim 3, wherein said transistors are controlled with fuse links.

5. The radio frequency identification tag of claim 3, wherein said transistors are controlled with a frequency selection circuit.

6. The radio frequency identification tag of claim 5, wherein said frequency selection circuit is a microcontroller.

7. The radio frequency identification tag of claim 1. wherein said trimming branches are controlled by fuse links.

8. The radio frequency identification tag of claim 7 wherein said fuse links are opened with a current.

9. The radio frequency identification tag of claim 7, wherein said fuse links are opened with a voltage.

10. The radio frequency identification tag device of claim 1, wherein said step-tunable inductor comprises a spiral coil having a plurality of coil turns.

11. The radio frequency identification tag device of claim 10, wherein all but one of said plurality of trimming branches are disconnected so as to adjust the inductance of said step- tunable inductor.

12. The radio frequency identification tag of claim 11, wherein each of said plurality of trimming branches form a different length inner coil turn of the plurality of coil turns of said spiral coil.

13. The radio frequency identification tag of claim 1, wherein material for said substrate is selected from the group consisting of PET, mylar, paper, plastic, silicon, kapton, ceramic, polyimide and polyvinylchloride (PVC).

14. The radio frequency identification tag of claim 1, wherein material for said step- tunable inductor is selected from the group consisting of copper, aluminum, gold, plated metal, and electrically conductive organic and inorganic materials.

15. The frequency identification tag of claim 1. wherein said step-tunable inductor has a plurality of fuse links, each of the plurality of fuse links in parallel with a turn of said step-tunable inductor wherein opening a one of the plurality of fuse links increases said step-tunable inductor inductance.

16. The frequency identification tag of claim 1, wherein said step-tunable inductor has a plurality of transistors, each of the plurality of transistor in parallel with a turn of said step-tunable inductor wherein turning off a one of the plurality of transistors increases said step-tunable inductor inductance.

17. A radio frequency identification (RFID) tag system, comprising:
    a radio frequency identification (RFID) tag comprising an insulated substrate having a surface, a parallel resonant antenna circuit disposed on the surface of said substrate, said parallel resonant antenna circuit having a step-tunable inductor comprising a spiral coil adapted for tuning said parallel resonant antenna circuit to a desired frequency, wherein said step- tunable inductor has trimming branches disposed on the surface of said substrate and entirely inside of said spiral coil, wherein said trimming branches are adapted for adjusting the inductance of said step-tunable inductor, and a simiconductor integrated circuit having electronic logic circuits for storing, receiving and transmitting data, said semiconductor integrated circuit being disposed on the surface of said substrate and connected to said parallel resonant antenna circuit;

a radio frequency interrogator for generating a radio frequency signal at the desired frequency which said parallel resonant antenna circuit is tuned; and an RFID tag reader connected to said radio frequency interrogator, said RFID tag reader detecting data signals from said RFID tag.

18. The radio frequency identification tag system of claim 17, wherein said step- tunable inductor is a spiral coil disposed on the surface of said substrate.

19. The radio frequency identification tag system of claim 17, wherein said step- tunable inductor comprises a spiral coil having a plurality of coil turns and a plurality of trimming branches inside of said spiral coil, wherein said plurality of trimming branches are adapted for adjusting the inductance of said step-tunable inductor.

20. The radio frequency identification tag system of claim 19, wherein all but one of said plurality of trimming branches are disconnected so as to adjust the inductance of said step- tunable inductor.

21. The radio frequency identification tag of claim 20, wherein each of said plurality of trimming branches form a different length inner coil turn of the plurality of coil turns of said spriral coil.

22. A method for step-tuning an inductor in a parallel resonant antenna circuit of a radio frequency identification (RFID) tag, said method comprising the steps of:

providing an insulated substrate having a surface;

providing a parallel resonant antenna circuit disposed on the surface of said substrate, said parallel resonant antenna circuit having a step-tunable inductor comprising a spiral coil having a plurality of trimming branches entirely inside of said spiral coil and disposed on the surface of said substrate;

providing a semiconductor integrated circuit having electronic logic circuits for storing, receiving and transmitting data, said semiconductor integrated circuit being disposed on the surface of said substrate and connected to said parallel resonant antenna circuit; and disconnecting all but one of said plurality of trimming branches so as to adjust the inductance of said step-tunable inductor, thereby changing a resonant frequency of said parallel resonant antenna circuit.

23. The method of claim 22, wherein the step of disconnecting is done by cutting with a laser.

24. The method of claim 22, wherein the step of disconnecting is done by ablation.

25. The method of claim 22, wherein the step of disconnecting is done by mechanically cutting.

26. The method of claim 22, wherein the step of disconnecting all but one of said plurality of trimming branches adjusts the length of an inner coil turn of the spiral coil of said step-tunable inductor.

27. The method of claim 22, wherein the step of disconnecting is done by opening fuse links.

28. The method of claim 27, wherein said fuse links are opened with a current.

29. The method of claim 27, wherein said fuse links are opened with a voltage.

30. The method of claim 29, wherein the step of disconnecting is done by controlling transistors.

31. The method of claim 30, wherein said transistors are controlled with fuse links.

32. The method of claim 30, wherein said transistors are controlled with a frequency selection circuit.

33. The method of claim 32, wherein said frequency selection circuit is a microcontroller.

* * * * *